United States Patent [19]
Pipa

[11] 3,808,733
[45] May 7, 1974

[54] TOY WIND INSTRUMENT HAVING SIMULATED VALVE CONTROLS FORMING SWITCH BUTTONS
[75] Inventor: William J. Pipa, New Hyde Park, N.Y.
[73] Assignee: Dicker International, Inc., New York, N.Y.
[22] Filed: Aug. 11, 1972
[21] Appl. No.: 280,050

[52] U.S. Cl................. 46/44, 46/175 AR, 46/232, 274/1 A
[51] Int. Cl............................................. A63h 5/00
[58] Field of Search............ 46/175 R, 175 AR, 232; 274/1 A

[56] References Cited
UNITED STATES PATENTS
1,434,780  11/1922  Kahn............................... 240/10.66
1,946,059   2/1934  Buchholz......................... 240/10.66
3,550,495  12/1970  Shotmeyer....................... 46/232 UX
2,508,423   5/1950  Robbins............................... 46/177
2,989,818   6/1961  Filger et al..................... 46/175 R X

*Primary Examiner*—F. Barry Shay
*Attorney, Agent, or Firm*—Gottlieb, Rackman & Reisman

[57] ABSTRACT

A toy simulating a musical wind instrument of the type having a multiplicity of finger operated pitch valve control means, in the body of which a battery-operated toy phonograph is housed. The circuit of the toy phonograph includes a normally open switch which is closed by any one of the multiplicty of finger operated simulated pich valve control means.

6 Claims, 2 Drawing Figures

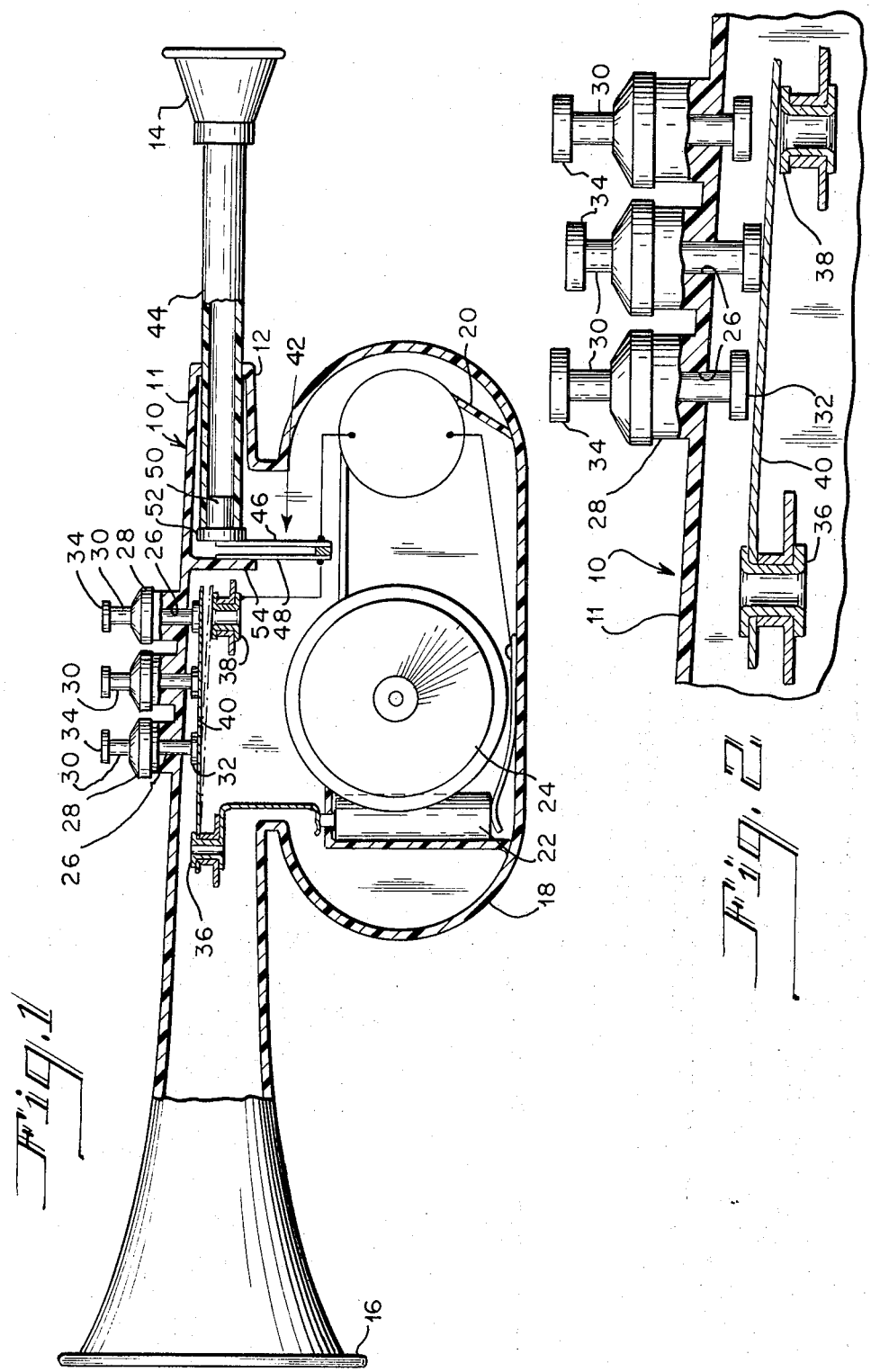

3,808,733

TOY WIND INSTRUMENT HAVING SIMULATED VALVE CONTROLS FORMING SWITCH BUTTONS

The present invention relates to a child's musical toy and, more specifically, to a child's musical toy simulating a wind instrument of the type whose pitch is controlled by finger manipulated pitch value control elements such as pins or plungers, as in a trumpet, or the like; the toy being capable of reproducing a musical tune such as could be produced on the real instrument, by following the normal mechanical procedure for playing the real instrument.

Numerous children's musical toys have heretofore been known which could be operated by a child to produce a musical tune. These include toys in which a sound-producing device may be operated by manually or electrically affected compression of a sound-producing device associated with the toy. They also include toy devices containing a toy phonograph and a grooved record which may be manually or mechanically or electrically operated for playing the record. However, to applicant's knowledge, there has never been available for a child, a toy simulating a wind instrument which the child could play, by simulating the mechanics of playing the real instrument which the toy simulates.

Generally stated, the invention contemplates the provision of a toy in the form and shape of a conventional wind instrument, such as any type of horn, saxophone or the like, in which pitch values are controlled by finger manipulated elements, and having provision for the positioning thereon or therein of a battery operated toy phonograph mounting a record on which a tune produced by the real instrument is recorded. The phonograph is connected in a circuit with a battery; the circuit containing switch means arranged to close the circuit through the phonograph by the manipulation of the simulated pitch controlling element. In one form of the invention, a second breach-controlled switch may be arranged in the phonograph circuit, in series with the first switch means that is actuated by blowing into the mouth piece of the instrument, to thereby require the user of the toy instrument to go through the entire procedure of playing the real instrument; namely, blowing into the mouth piece and using the fingers. One form of a breath-controlled switch is shown and described in my co-pending application Ser. No. 139,046, filed Apr. 4, 1971, now U.S. Pat. No. 3,733,741.

It is an object of the present invention to provide a musical toy of the character described which may closely simulate the shape and form of a real wind instrument to afford a child using it the feeling and enjoyment of blowing the real instrument and of listening to a tune played by it.

It is still another object of the present invention to provide a child's musical toy of the character described which is strong and sturdy and substantially fool-proof in its operation.

It is still another object of the present invention to provide a musical toy of the character described which may reproduce relatively long musical tunes, to enhance the pleasure of the child using the instrument.

It is a further object of the present invention to provide a child's toy musical instrument of the character described which permits ready access for replacement of the phonograph actuating battery.

The foregoing and other objects and advantages of the child's musical toy of the present invention will become more readily apparent to those skilled in the art from the embodiment thereof shown in the accompanying drawing and from the related description following. It will be understood, however, that such embodiment is shown by way of illustration only, to make the principles and practice of the invention more readily comprehensible and without any intent of limiting the invention to the specific details therein shown.

In the drawings:

FIG. 1 is a side elevational and partly sectional view of a child's musical toy, simulating a trumpet, embodying the present invention; and FIG. 2 is a fragmentary, enlarged, elevational and partly sectional view of the switch control mechanism of FIG. 1.

More specifically stated, the toy instrument of the invention illustrated in the drawing comprises a simulated trumpet, generally designated as 10, having a tubular portion, 11, having a breath inlet end, 12, provided with a mouth piece, 14, and a flared breath-outlet end, 16, and a housing, 18, depending from the tubular portion 11, where the trumpet convolutions are generally located, in which is housed a toy phonograph, 20, connected in circuit with a battery, 22, and carrying a grooved record 24.

The trumpet 10 is provided in tubular portion 11, above housing 18, with a plurality such as three, openings, 26, defined by outwardly extending collars, 28, in each of which there is slidably mounted a pin or button 30, provided with an enlarged base, 32, and preferably also with an enlarged head 34.

The circuit of the phonograph includes a switch comprising a pair of terminals, 36 and 38, spaced longitudinally of the tubular portion 11, and at least one of which as, 36, is disposed outwardly of one of the outermost of the openings 26 and the other one of which, as 38, may be disposed substantially immediately below the opposed end most of the openings 26. Terminals 36 and 38 may be supported within the tubular portion 11 of the trumpet in any desired manner. As numerous ways will suggest themselves to anyone skilled in the art for mounting such terminals within the trumpet, it is not thought necessary to illustrate any specific way of doing so; the shape and position of the terminals being diagrammatically shown in the drawings.

The terminal 36, spaced from the adjacent openings 26, has secured thereto one end of a resilient spring arm or blade, 40, of a length to span the distance between terminals 36 and 38, and which is normally upwardly biased so that its free end is spaced from the end underlieing terminal 38. Terminals 36 and 38 are so located with reference to pins 30 that the bases 32 of such pins normally rest on blade 40 and are maintained by the blade in upwardly disposed position, and pins 30 are of sufficient length that each one of them when depressed by a finger will sufficiently depress the blade 40 to bring its free end into contact with the underlying terminal 38.

It may here be stated that blade 40 may be of sufficient inherent resilience to itself maintain the pins 30 in upward, inactive position. If desired, however, independent spring means may be provided in association with each of the pins 30 for maintaining it in withdrawn position, in a manner that will be readily understood and not thought necessary to be specifically illustrated.

While the phonograph actuating mechanism has been illustrated to include a single switch in the circuit of the phonograph, actuable by each of the plurality of pins 30, it will be readily understood and apparent that a plurality of individual normally open switches may be provided, connected parallel in the phonograph circuit, each underlying one of the pins 30 and actuable only by the pin 30 which it underlies.

It will be apparent that by the foregoing arrangement, a child using the toy will place the mouthpiece 14 in the mouth and using the fingers to manipulate the pins 30, one or more at a time, to depress them, will thereby close the circuit 36–38 to the phonograph, causing the playing of the record. It will also be clear that as long as any one of the pins 30 is held by the child in depressed position, the switch 36–38 will remain closed and the record will continue to be played and replayed; stopping only when the pressure on all of the pins 30 is released.

For a more realistic toy, a breath-controlled switch diagramatically illustrated in FIG. 1 of the drawings and generally designated as 42 may be arranged in series with switch 36–38 in the circuit of the phonograph.

For that purpose, a tube 44 may be inserted into the inlet end portion 12 of the trumpet; with the mouthpiece 14 set into the end of tube 44. The second switch, diagramatically shown as 42, is connected into the circuit of the phonograph, in series with switch 36–38. Switch 42 is shown to comprise a pair of spaced, parallel strips of electro-conductive material, 46 and 48, each forming a terminal of the switch and each connected by one end into the circuit of the phonograph and extending in the direction of the inner end of tube 44, with their free end disposed opposite the inner opening thereof. At least the strip closest to the open end of tube 44; namely strip 46, is resilient and capable of being offset to contact the other strip 48 to close the circuit. A plug 50 is set into the inner end of tube 42 and is provided with a flange 52 which overlies the edge of the tube.

It will be seen that switch 42 will normally be kept open by the strip 46 and that in blowing through the mouthpiece 14 into tube 44, the plug 50 will be partly expelled from the tube to contact and press against the switch strip 46 to offset it against strip 46 and close the circuit through switch 42.

A back-up plate 54 may be provided immediately inwardly of switch strip 48 to insure constant contact of the switch strips on breath pressure of the outwardly propelled plug 50.

It will be apparent that by the addition of the second breath actuated switch 42, a child using the toy wind instrument "plays" the instrument simulated by the toy; namely, the blowing into the instrument which will close the switch 42 and then the fingering of the pins 30 to close the second switch 36–38, to complete the circuit through the phonograph to play the record.

It may be here be stated that while the secondary switch in the phonograph circuit has been illustrated and described as a breath-operated switch, other types of mouth operated switches may be used for the same purpose and with equal effect. Such other types of mouth-operated switches may include normally open switches disposed within the mouth piece of the toy that may be closed by the compression of the lips or teeth against the mouth piece.

This completes the description of the child's musical toy of the present invention. It will be readily apparent that numerous modifications and variations may be made in the toy of the invention, by anyone skilled in the art, in accordance with the principles of the invention hereinabove set forth, and without exercise of any inventive ingenuity.

I claim:

1. A musical toy comprising a body simulating a wind instrument, said instrument having finger-operated simulated pitch-valve control means; said body having hollow portions and a mouthpiece, said hollow portions defining a housing for a battery-operated toy phonograph; a battery-operated toy phonograph mounted within said housing, said toy phonograph including an electric motor, a battery connected in circuit with said motor, a turntable and a grooved record mounted on said turntable; means simulating the pitch-valve control means of said instrument mounted on said body; said simulated pitch-valve control means including a plurality of openings formed through a wall portion of said body, and a member disposed in each said opening for movement therein inwardly and outwardly of said body; and normally open switch means connected in said circuit arranged to be closed by either of at least two of said members moved inwardly under finger pressure.

2. The musical toy of claim 1, wherein each said member is provided with means for retaining the same in the opening within which it is disposed against displacement therefrom.

3. The musical toy of claim 2, wherein each said opening is defined by an outwardly projecting collar said member disposed within said collar and projecting therefrom.

4. The musical toy of claim 1, wherein said switch means comprises a pair of spaced terminals in said circuit and a resilient switch blade connected by one end to one of said terminals and biased away from the other of said terminals in the direction of said wall portion and arranged to be pressed into contact with said other terminal by the inward pressure of either one of said two members and to return said members to the outward position upon release of said finger pressure.

5. The musical toy of claim 4, wherein said blade-connected terminal is disposed opposite a point spaced from one end of said row of openings and said blade is aligned with said row of openings, whereby inward pressure by either of at least said two members will press said blade into contact with the other of said terminals.

6. The musical toy of claim 1, including a second, normally open mouth operated switch in said circuit having two spaced terminals adapted to be brought into contact with each other to energize said motor when said switch means responsive to said finger pressure is closed.

* * * * *